Figure 1:
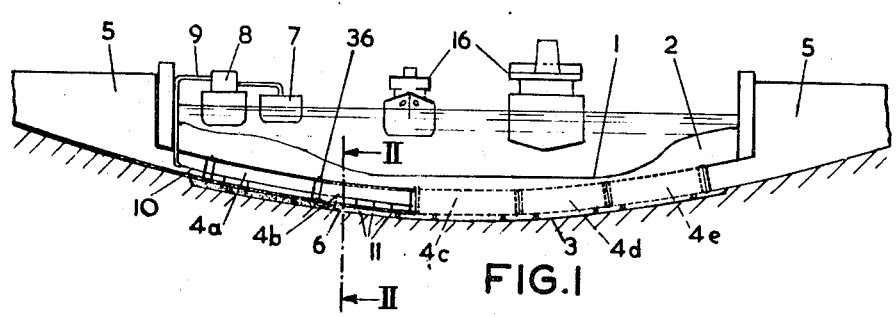

United States Patent van der Veen et al.

[15] 3,683,632
[45] Aug. 15, 1972

[54] METHOD OF LAYING A FOUNDATION FOR A STRUCTURAL ELEMENT UNDER WATER

[72] Inventors: Romke van der Veen; Albert Griffioen, both of Utrecht, Netherlands

[73] Assignee: Combinatie Weslerschelde v.o.f, Utrecht, Netherlands

[22] Filed: July 28, 1970

[21] Appl. No.: 58,771

[52] U.S. Cl. .................................................. 61/50
[51] Int. Cl. ........................................... E02d 27/52
[58] Field of Search ............................ 61/50–52, 42

[56] References Cited

FOREIGN PATENTS OR APPLICATIONS

| 425,092 | 3/1911 | France | 61/50 |
| 750,132 | 1/1967 | Canada | 61/50 |

Primary Examiner—J. Karl Bell
Attorney—Snyder and Butrum

[57] ABSTRACT

Under a structural element and around a supply place a crater is made by laying a dike of foundation material in the space under the structural element and around the supply place and the space around said crater is subsequently filled up with foundation material by supplying suspension of foundation material with water into the crater and by causing it to flow over the edge of said crater. With this method the edge of the crater grows gradually so as to form a continuous layer of foundation material. The suspension of foundation material with water flowing over the edge of the crater is heavier than silt found around the crater resulting in the suspension driving the silt before it out of the space without being mixed with the silt.

11 Claims, 17 Drawing Figures

Patented Aug. 15, 1972

3,683,632

4 Sheets-Sheet 1

INVENTOR
ROMKE VAN DER VEEN
and
ALBERT GRIFFIOEN
BY

ATTORNEY

Patented Aug. 15, 1972

3,683,632

4 Sheets-Sheet 2

INVENTOR
DOMKE VAN DER VEEN
and
ALBERT GRIFFIOEN

BY

ATTORNEY

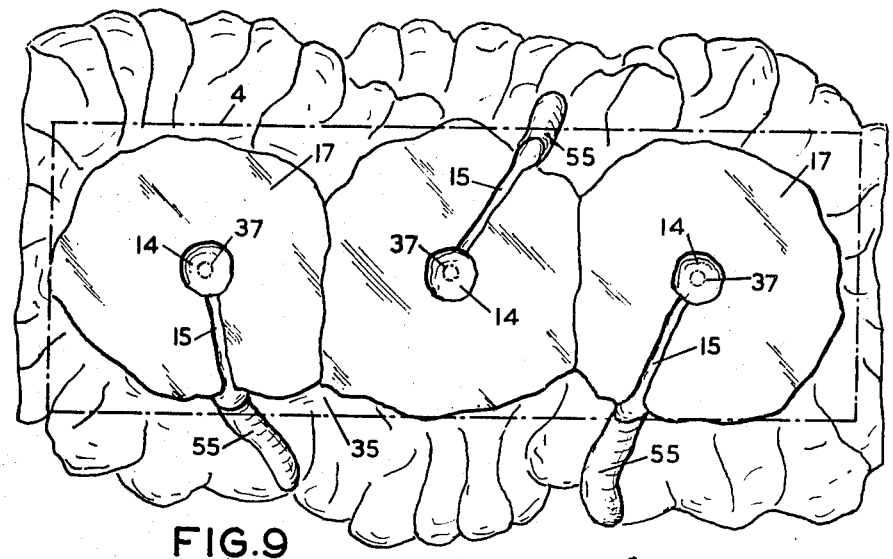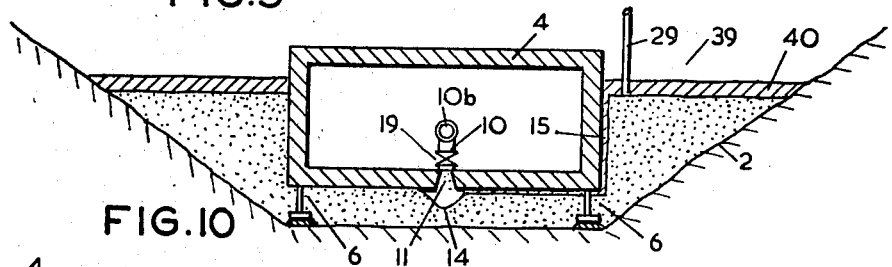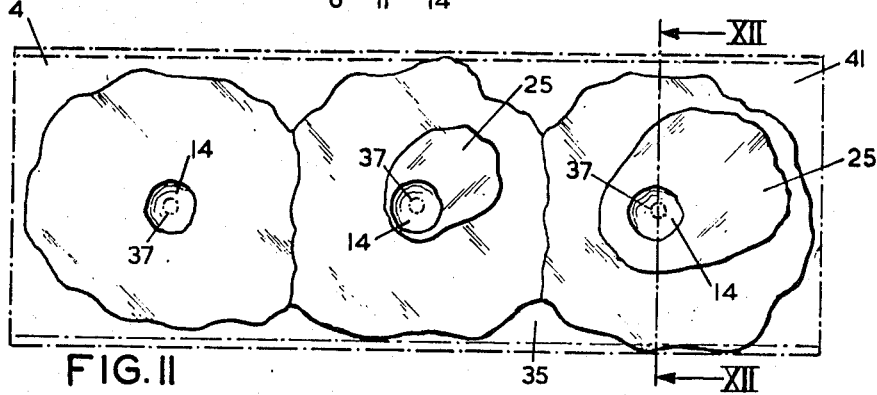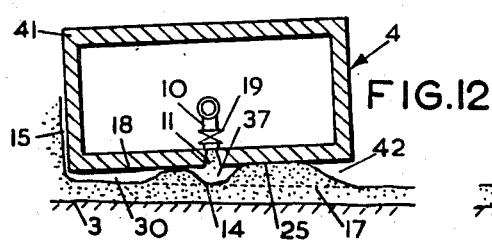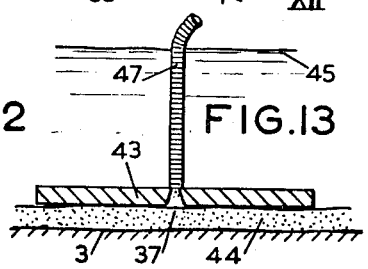

METHOD OF LAYING A FOUNDATION FOR A STRUCTURAL ELEMENT UNDER WATER

The invention relates to a method of laying a foundation for a structural element under water, in which space under the structural element is filled up with foundation material by supplying into the space a suspension of foundation material with water at at least one supply place.

Such a method is known. In the known method a suspension of foundation material with water is injected at one or more fixed supply places under the structural element by a spout operation, so as to fill up first the most remote parts of the space under the structural element and successively less remote parts and the parts near the supply place. Meanwhile an amount of water is sucked up in the vicinity of the supply place, said amount of water being equal to the amount of suspension supplied to the supply place. In dependance on the percentage of foundation material observed in the water sucked up the rate of filling of the space in the vicinity of the supply place is estimated. In this known method at each fixed supply place a belonging sucking pipe and a belonging spout pipe extending under the structural element and being mounted rotatably therein are required. For dividing the foundation material from each fixed point over places remote from said point and surrounding said fixed point under the structural element the spout pipe should be directed in a controlled way, whereas the foundation material should be conveyed from the nozzle of the spout pipe unto its remote foundation place by spout operation for preventing that cavities in the created foundation layer remain unfilled.

The invention has the object to provide a method of the kind mentioned in the first paragraph, of which the above mentioned disadvantages are avoided or reduced. To this aim under the structural element and around the supply place a crater is made by laying a dike of foundation material in the space under the structural element and around the supply place and the space around said crater is subsequently filled up with foundation material by supplying suspension into the crater and by causing it to flow over the edge of said crater. With this method the edge of the crater grows gradually so as to form a continuous layer of foundation material. The suspension of foundation material with water flowing over the edge of the crater is heavier than silt found around the crater resulting in the suspension driving the silt before it out of the space without being mixed with the silt, owing to the flow velocity of the suspension being low. As a result of this the foundation layer sets to very little extent which can be calculated previously.

Furthermore setting can be compensated by additional supply of suspension to the supply place.

The invention even has the object to provide a further developed method for positioning the structural element relative to reference means if a plurality of craters are created under the structural element and these craters are selectively supplied with suspension.

If the structural element is positioned in a trench and if the space of said trench alongside the structural element has to be filled with foundation material preferably this space is filled with foundation material by causing suspension to flow from the crater over the edge thereof to the space found alongside the structural element. In this case the foundation material foreces itself completely under the silt gathered in the trench.

The operation of previously removing silt gathered in the trench is preferably not carried out, as this operation is superfluous with the method according to the invention.

The invention concerns and provides also a structural element having a foundation laid by performing the method according to the invention.

The invention will be illucidated in the following description with reference to the accompanied drawing.

Figure 2:
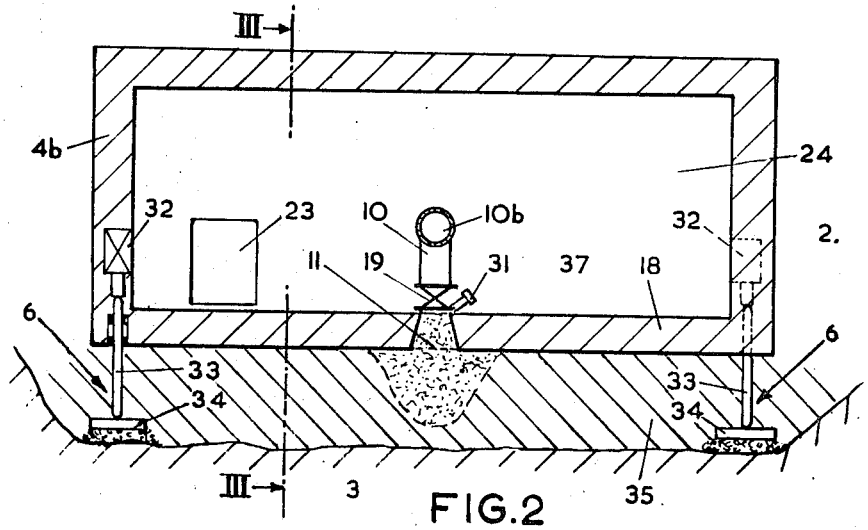
Figure 3:
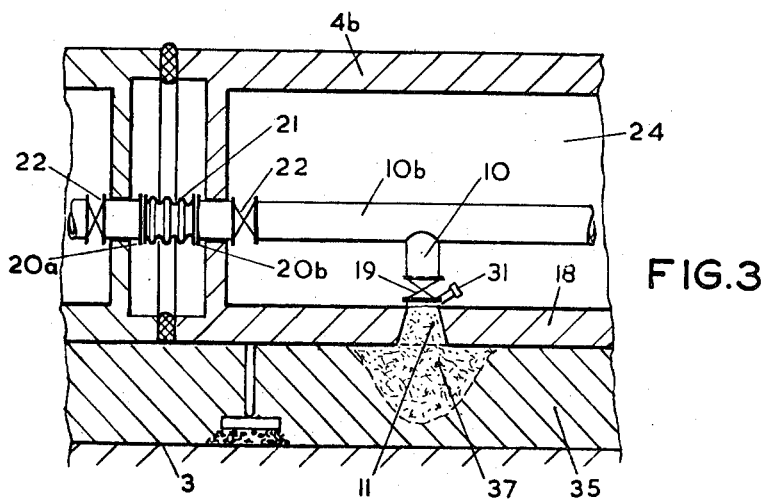
Figure 4:
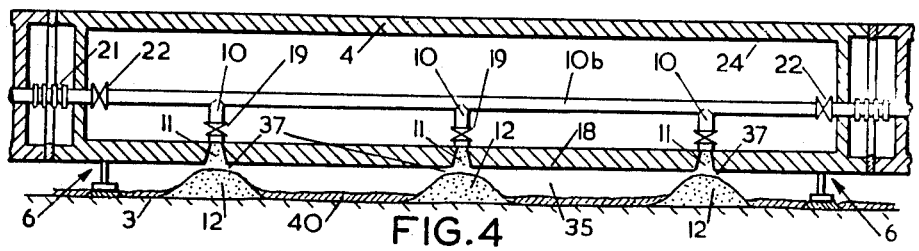
Figure 5:
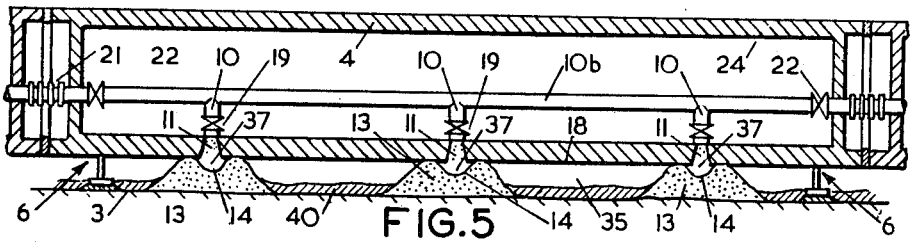
Figure 6:
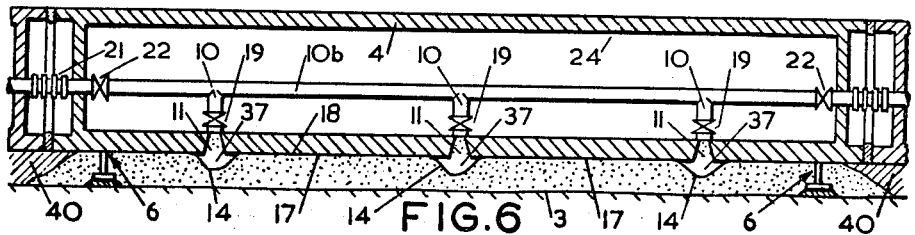
Figure 7:
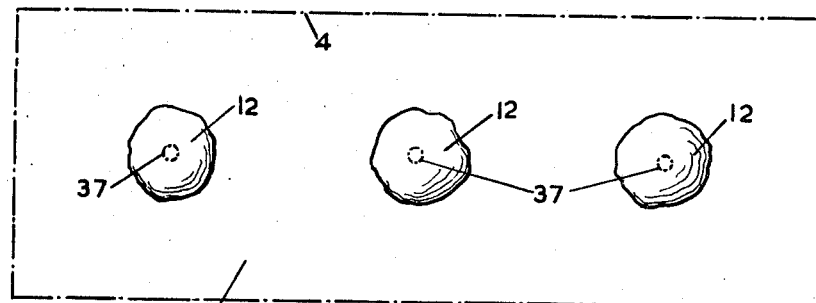
Figure 8:
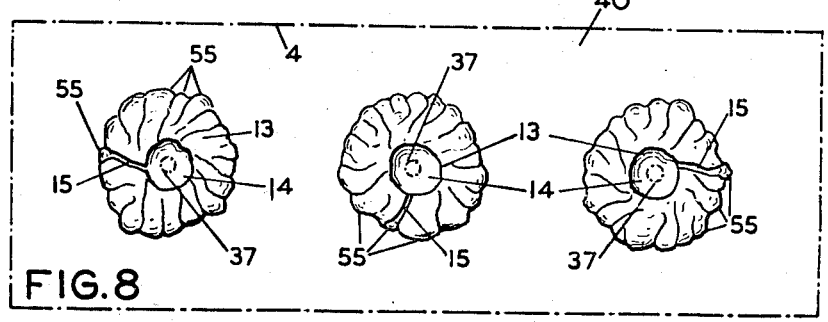
Figure 14:
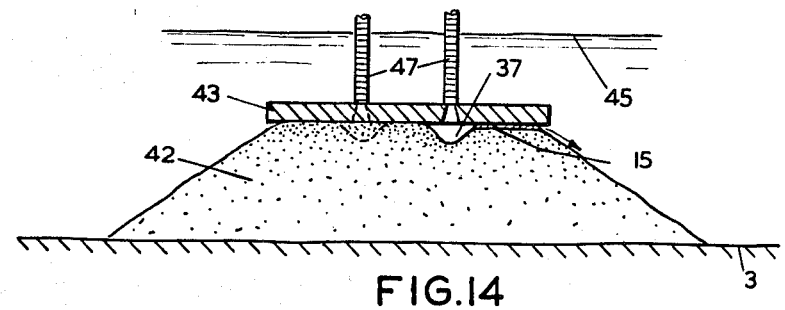
Figure 15:
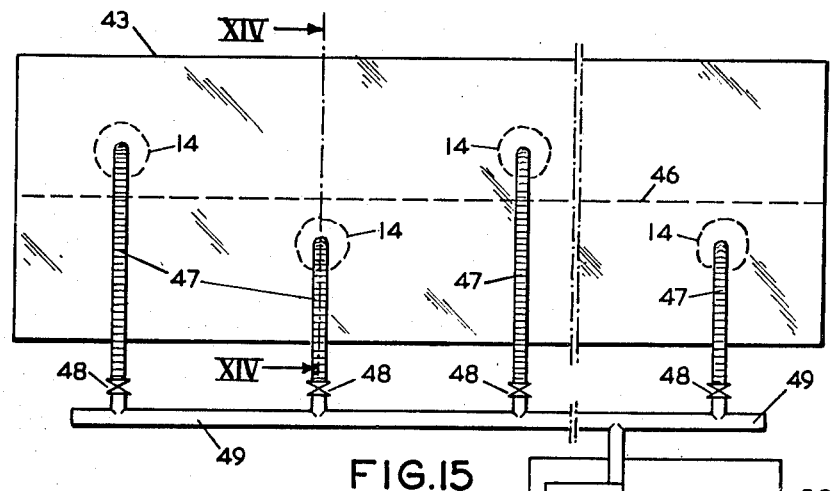
Figure 16:
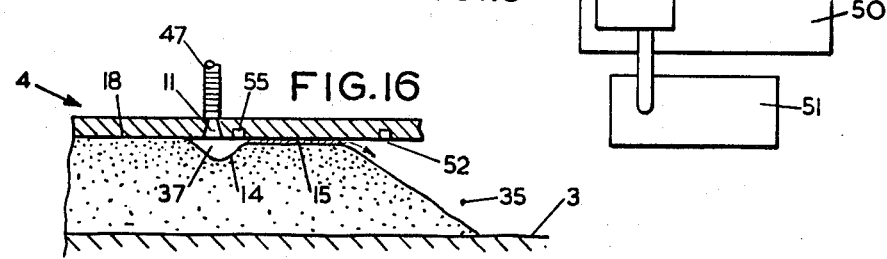
Figure 17:
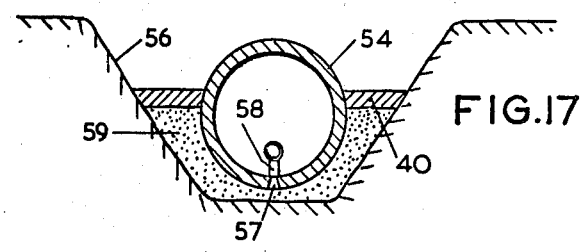

In the drawing show schematically:

FIG. 1 an elevation of a tunnel during performance of the method according to the invention, FIG. 2 on larger scale a section along the line II—II of FIG. 1, FIG. 3 a detail in longitudinal section along the line III—III of FIG. 2, FIGS. 4, 5 and 6 longitudinal sections of a detail of a tunnel element in subsequent stages of the method according to the invention, FIGS. 7, 8 and 9 plan views of FIGS. 4, 5 and 6 respectively, FIG. 10 a cross section of a tunnel element in still a later stage than FIG. 9, FIGS. 11 and 12 a plan view and a cross section of a tunnel element during performance of a further developed method according to the invention, FIGS. 13 and 14 cross sections of a structural element with foundation layer in subsequent stages during performance of another method according to the invention, FIG. 15 a plan view of FIG. 13, FIG. 16 a detail of a tunnel element of FIGS. 1–12 and FIG. 17 a section of another embodiment of a structural element.

Under a river bed 1 a sink trench 2 having a trench bottom 3 is dredged. In this sink trench 2 tunnel elements 4a–4e are connected with open ramp elements 5. In FIG. 1 tunnel element 4a is already laid and sand is already injected under it. The tunnel element 4b is already sunk, is adjusted on provisional supports 6, its junction side 36 being already connected to the tunnel element 4a. Sand is conveyed in a barge 7 and is sucked up from the barge 7 by means of a floating suction dredger installation 8, positioned outside of the navigation channel, said sand being supplied to a supply place 37 through pressure conduit 9, suspension conduits 10 and being injected by supply nozzles 11, connected to said suspension conduits 10 into space 35 positioned under the tunnel element 4b. The tunnel elements 4c, 4d and 4e are not yet sunk in FIG. 1.

It may be seen from vessels 16 that the method according to the invention does not obstruct shipping above the tunnel elements 4b, 4c and 4d.

Each supply nozzle 11 is mounted in the tunnel bottom 18 and communicates through a valve 19 with a suspension conduit 10b running the entire length of the tunnel element 4b. This suspension conduit 10b has at each of both ends of tunnel element 4b a coupling member 20b provided with a valve 22 and adapted to be connected by means of a flexible conduit 21 to coupling members 20a and 20c of the tunnel elements 4a and 4c. The workers which have to couple said coupling members come through manholes 23 provided in partitions 24.

The method according to the invention is illustrated most clear in FIGS. 4–10. At the same time or successively suspension of sand and water is supplied to the three supply places 37 through supply nozzles 11. Sand settles therefrom first as a mount 12 (see FIGS. 4 and 7). Subsequently a dike of sand 13 extending up to the tunnel bottom 18 is laid around the supply place 37 by continuously supplying suspension, so as to create a crater 14. After that the space 35 around and adjacent to the crater 14 is filled with sand by causing suspension to flow from the crater 14 between the edge thereof and the lower side of the tunnel bottom 18. To this aim the supply of suspension from supply nozzle 11 into the crater 14 is continued. The suspension flows from the crater 14 through a channel 15 which owing to fluidization of sand already settled, is created as a result of a pressure difference between the pressure in the crater 14 and the pressure outside thereof. The channel 15 arises in that direction from the crater 14, in which the resistance of sand already settled and to be fluidized is least, that is to say at that side of the crater 14 where the width of the sand table 17 engaging the tunnel bottom 18 is smallest, or with other words at that side of the crater 14, which needs most pressingly an addition of sand for filling the space 35. In this way disc-shaped sand tables 17 arise around the supply places 37, a little heap of sand 55 settling at the end of channel 15 against the outside of each sand table 17 each time. When the flow resistance in the direction of channel 15 increases in dependance on extension of this channel 15, the flow velocity decreases in this channel, resulting in an increase of settling of sand from the suspension flowing in this channel 15. This results in an additional increase of flow resistance until the required pressure difference for flow between the crater 14 and the space 35 outside the sand table 17 is greater than the required pressure difference for creating another channel 15 in another direction, in which the radius of the sand table 17 at that time is smallest.

The operation of uniformly filling of space 35 is continued, when the sand tables 17 engage each other. As shown in FIG. 10 even the sink trench 2 alongside the tunnel elements 4 can be filled with sand 38 by a suspension supply from the crater 14 through suspension channel 15 extending under as well as at the side of the tunnel element 4.

During creating a mount 12, during laying a dike of sand 13, during filling space 35 around crater 14 as well as during filling space 39 of sink trench 2 alongside tunnel element 4 the heavy suspension, forcing itself under the light weight silt 40, forces this silt 40 before itself.

As soon as sufficient sand is observed in space 39, for instance by means of gauging rods 29, the valve 19 is shut off. The supply nozzles 11 as well as the craters 14 communicating therewith are filled with water tight, curing mortar after use.

After having finished the method according to the invention at all tunnel elements 4a – 4e to be sunk the suspension conduits 10 are cut off under the valves 19 and are removed.

The provisional supports 6 consist of foot plates 34 and adjustable legs 33 standing on said foot plates 34 and extending through the tunnel bottom 18, the tunnel element 4b supporting on said legs 33 through jacks 32.

The supply nozzles 11 are preferably formed by diffusors for reducing the outlet velocity of the suspension, so as to reduce the volume of the crater 14 to a volume which is as small as possible, said crater 14 being filled with mortar later on or not.

During carrying out the method according to the invention care is taken that the tunnel elements 4 are maintained on their provisional supports 6 by means of ballast.

With the further developed method according to the invention positioning of the tunnel element 4b relative to tunnel element 4a is possible. This may be carried out in several ways, for instance by reducing the amount of ballast in that corner 41 of the tunnel element 4 which is at a lower level than required (see FIGS. 11 and 12). Then the suspension flowing over the sand tables 17 forces the corner 41 of the tunnel element upwards, resulting in additional sand tables 25. Again the suspension is driven in that direction which needs most pressingly additional sand. The inclined space 30 is filled gradually completely with sand although its shape is asymmetric relative to the supply places 37.

The operation of positioning the tunnel element may in stead of by selectively dividing the amount of ballast, not shown, over the surface of tunnel bottom 18, be carried out in an easier way, for instance by selectively controlling the pressure and/or the percentage of sand in the suspension supplied to the supply places 37. In this case the suspension is supplied with a higher pressure and /or with a higher percentage of sand at that supply place 37 of the tunnel element 4, where the tunnel element has to be lifted than at the other supply places 37.

The FIGS. 13–15 show a method for laying a body of sand 42 under water. To this aim a plate of concrete 43 is sunk at the bed 44 of the water 45. At regular distances from each other and turn by turn at either sides of longitudinal plane 46 supply places 37 for supplying suspension, as described above, are provided. Each of these supply places 37 has a supply nozzle 11 communicating with a flexible suspension conduit 47 each on its turn communicating with a pressure conduit 49 of a suction dredging installation 50 sucking sand from a barge 51.

By selectively controlling the pressure of the suspension supplied to the supply places 37 the plate 43 can be kept in horizontal position. The plate 43 is lifted continuously and gradually by the supply pressure of the suspension, if the weight of the plate 43 is sufficient low for being beaten by the suspension pressure.

In the further developed method according to the invention (see FIG. 16) a pressure pick up 53 picking up the pressure in the crater 14 and a pressure pick up 52 picking up the pressure outside of the crater 14 are provided in the vicinity of supply place 37 and outside of the crater 14 respectively, particularly for positioning the bottom 18 of structural element 4. This pressure pick up 53 and possibly a greater number of pressure pick ups 52 can provide useful information concerning the rate of sand in the space 35.

The bottom 18 of tunnel element 4 does not need to be exactly flat. It is even possible having each tunnel element carried out as a round tube 54 (see FIG. 17), which at its lower side and alongside is provided with a layer of sand 59 in a sink trench 56 by carrying out the method according to the invention supplying suspension of sand with water through a supply nozzle 58 at supply place 57.

What we claim is:

1. The method of laying a foundation for a structural element under water, which comprises the steps of:
    a. locating the structural element in a body of water such that its undersurface is spaced above the bottom of the body of water;
    b. forming a suspension of particulate material such as sand in water and flowing such suspension into the space between said undersurface and said bottom from a localized region close to or at said undersurface and at a rate allowing the particulate material to settle out of the suspension and deposit on said bottom below said region;
    c. continuing the flowing of suspension and depositing of particulate material according to step (b) to build a mound of deposited material reaching from said bottom to said undersurface and forming a dam or dike engaging said undersurface to provide support for the structural element and surrounding said region;
    d. continuing the flow of suspension at pressure sufficient to maintain (1) a crater in said mound which is filled with suspension D1) a crater in said mound which is filled with suspension and (2) a flow of such suspension which channels from the crater through said dam immediately below said undersurface and spills over the edge of said dam to settle out and deposit further material to increase the plan view size of said mound; and
    e. continuing step (d) until the plan view size of the mound supporting the structural element is of desired size.

2. Method as claimed in claim 1, characterized in that the suspension is supplied into said crater through a bottom of said structural element.

3. Method as claimed in claim 1, characterized in that space alongside the structural element is filled with foundation material by causing suspension to flow from the crater over the edge thereof to the space found alongside the structural element.

4. Method as claimed in claim 1, characterized in that the pressure of the supplied suspension is picked up.

5. Method as claimed in claim 4, characterized in that the pressure at at least one pressure pick up place outside of the crater is picked up.

6. Method as claimed in claim 1, characterized in that a plurality of craters is created under the structural element and the structural element is positioned relative to reference means by selectively supplying suspension to said craters.

7. Method as claimed in claim 1, characterized in that after laying a first foundation layer of foundation material the structural element is lifted at at least one of its sides and that an additional foundation layer is laid on the first.

8. Method as claimed in claim 1, characterized in that a foundation layer is laid under the structural element by gradually lifting the structural element, so as to raise the already laid foundation layer gradually.

9. Method as claimed in claim 8, characterized in that the structural element is lifted by means of the pressure of the suspension supplied to the supply place.

10. The method of laying a foundation as defined in claim 1 wherein the suspension is flowed into said space at a plurality of regions similar to the first region but spaced therefrom and from each other, and performing steps (c) and (d) for each region until the mounds associated with each region grow and merge into a substantially continuous foundation layer support beneath said structural element.

11. The method of laying a foundation layer of particulate material such as sand beneath a member submerged in a body of water and having an undersurface of substantial plan view area which is spaced above the bottom of the body of water, which comprises the steps of:
    a. discharging a suspension of such material in water and discharging same gently toward said bottom from a confined region or point located within said plan view area and closely adjacent said undersurface to settle out and deposit said material from the suspension onto said bottom to build upwardly therefrom toward and to said undersurface until the deposited material engages said undersurface in substantially surrounding relation to said region; and then
    b. maintaining the discharge of suspension under pressure sufficient to channel through the deposited material at said undersurface and deposit further material in an ever-widening area between said bottom and said undersurface until such area is of desired size.

* * * * *

UNITED STATES PATENT OFFICE
CERTIFICATE OF CORRECTION

Patent No. 3,683,632     Dated Aug. 15, 1972

Inventor(s) Romke van der Veen and Albert Griffioen

It is certified that error appears in the above-identified patent and that said Letters Patent are hereby corrected as shown below:

Column 5, line 31, delete "D1) a crater in said mound"
          line 32, delete "which is filled with suspension"
Column 6, line 35, "discharging" should be --forming--
Name of assignee is: Combinatie Westerschelde v.o.f.

Signed and sealed this 9th day of January 1973.

(SEAL)
Attest:

EDWARD M. FLETCHER, JR.          ROBERT GOTTSCHALK
Attesting Officer                Commissioner of Patents